United States Patent
Hyde et al.

(10) Patent No.: US 8,044,801 B1
(45) Date of Patent: Oct. 25, 2011

(54) RFID TAG WITH DOUBLE-SWITCH RECTIFIER

(75) Inventors: John D. Hyde, Corvallis, OR (US); Ronald A. Oliver, Seattle, WA (US); Charles J. T. Peach, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 904 days.

(21) Appl. No.: 12/042,141

(22) Filed: Mar. 4, 2008

Related U.S. Application Data

(60) Provisional application No. 60/905,416, filed on Mar. 7, 2007, provisional application No. 60/925,920, filed on Apr. 24, 2007, provisional application No. 60/937,090, filed on Jun. 25, 2007.

(51) Int. Cl.
G08B 13/14 (2006.01)

(52) U.S. Cl. ............... 340/572.1; 455/73; 455/343.1; 340/10.1

(58) Field of Classification Search .......... 340/500, 340/540, 568.1, 572.1, 1.1, 10; 455/41.1, 455/41.3, 73, 269, 270, 343.1, 343.2, 343.3; 320/101, 108

See application file for complete search history.

(56) References Cited

U.S. PATENT DOCUMENTS

| | | | |
|---|---|---|---|
| 5,394,367 A | 2/1995 | Downs et al. | |
| 5,467,081 A | 11/1995 | Drews et al. | |
| 5,535,164 A | 7/1996 | Adams et al. | |
| 5,874,896 A | 2/1999 | Lowe et al. | |
| 7,108,183 B1 | 9/2006 | Cox, Jr. | |
| 7,167,090 B1 | 1/2007 | Mandal et al. | 340/538.14 |
| 7,321,300 B2 | 1/2008 | Friedrich et al. | |
| 2004/0246103 A1 | 12/2004 | Zukowski | |
| 2005/0073197 A1 | 4/2005 | Matsubara et al. | |
| 2005/0130389 A1 | 6/2005 | Yamakazi et al. | |
| 2007/0176756 A1 | 8/2007 | Friedrich | |
| 2007/0199988 A1 | 8/2007 | Labgold et al. | |
| 2007/0273481 A1 | 11/2007 | Soleimani | |
| 2008/0001725 A1 | 1/2008 | White et al. | |
| 2008/0080214 A1 | 4/2008 | Umeda et al. | |

OTHER PUBLICATIONS

Specification for RFID Air Interface: EPCTM Radio-Frequency Identity Protocols Class-1 Generation-2 UHF RFID Protocols for Communications at 860 MHz—960 MHz Version 1.2.0, 2004-2008 EPCglobal Inc. Oct. 23, 2008 , 1-108.

"Declaration of Stacy L. Jones authenticating attached website materials", www.autoid.org/SC31/sc_31_wg4_sg3.htm Sep. 1, 2006.

Non-Final Office Action U.S. Appl. No. 11/877,054 mailed Mar. 9, 2010.

EPCglobal, Inc "Specification of RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec") *EPCglobal Inc*. Dec. 17, 2005.

EPCglobal, Inc "Specification of RFID Air Interface-EPC Radio-Frequency Identity Protocols Class-1 Generation-2 UHF RFID Protocol for Communications at 860 MHz-960 MHz, Version 1.0.8." (a.k.a. "The Gen 2 Spec") *EPCglobal Inc*. Dec. 14, 2004.

*Primary Examiner* — Brian Zimmerman
*Assistant Examiner* — Sara Samson
(74) *Attorney, Agent, or Firm* — Turk IP Law, LLC

(57) ABSTRACT

The present disclosure provides a power rectifier for a Radio Frequency Identification tag circuit. The power rectifier is constructed from a pair of complementary MOS transistors. Gates of the transistors have predetermined voltages applied to them. The applied voltages bias the transistors to near their active operating regions, while an additional RF control signal is being applied to only one of the gates of the transistors in the complementary pair.

16 Claims, 11 Drawing Sheets

DOUBLE-SWITCH CMOS RF RECTIFIER STAGE

*RFID TAG COMPONENTS*

*DOUBLE-SWITCH RECTIFIER AS PART OF POWER MANAGEMENT UNIT*

DICKSON RF "CHARGE PUMP" STAGE

NMOS RF RECTIFIER STAGE

CMOS RF RECTIFIER STAGE

FROM US 7167090

*POWER RECTIFIER FOR RFID TAG
WITH DOUBLE-SWITCH STAGE*

*POWER RECTIFIER FOR RFID TAG
WITH DUAL DOUBLE-SWITCH STAGE*

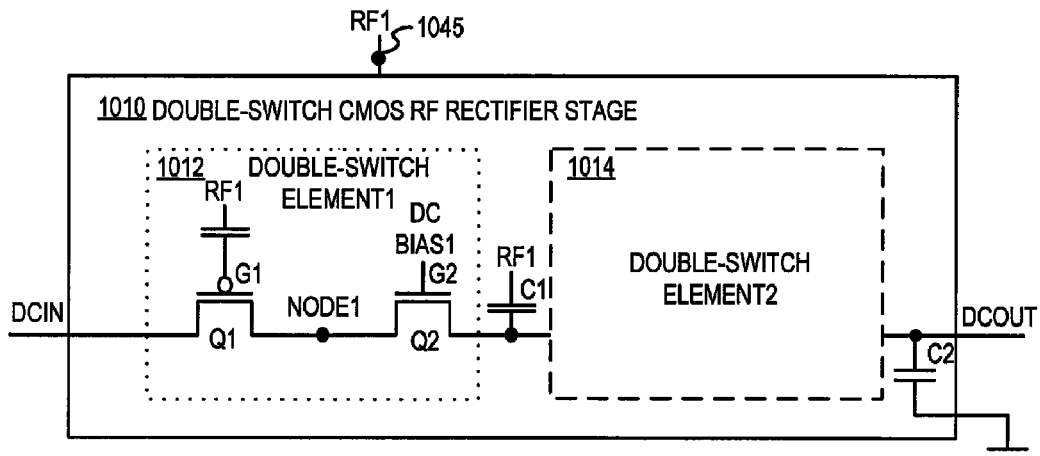
FIG. 10A    DOUBLE-SWITCH CMOS RF RECTIFIER STAGE
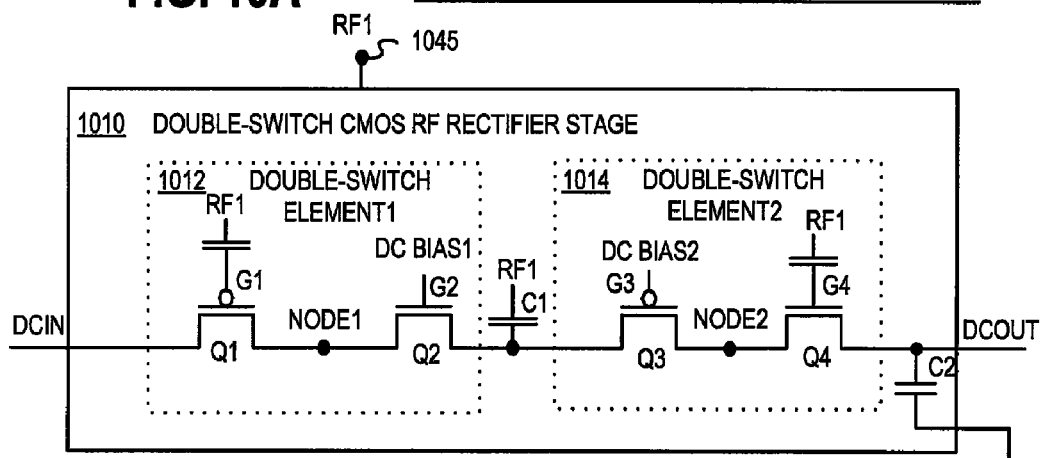
FIG. 10B    DOUBLE-SWITCH CMOS RF RECTIFIER STAGE
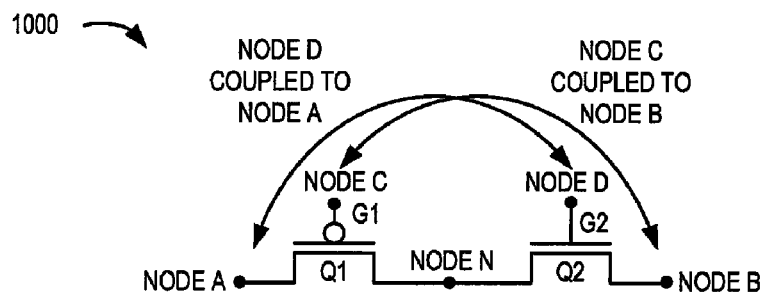
FIG. 10C    DOUBLE-SWITCH ELEMENT

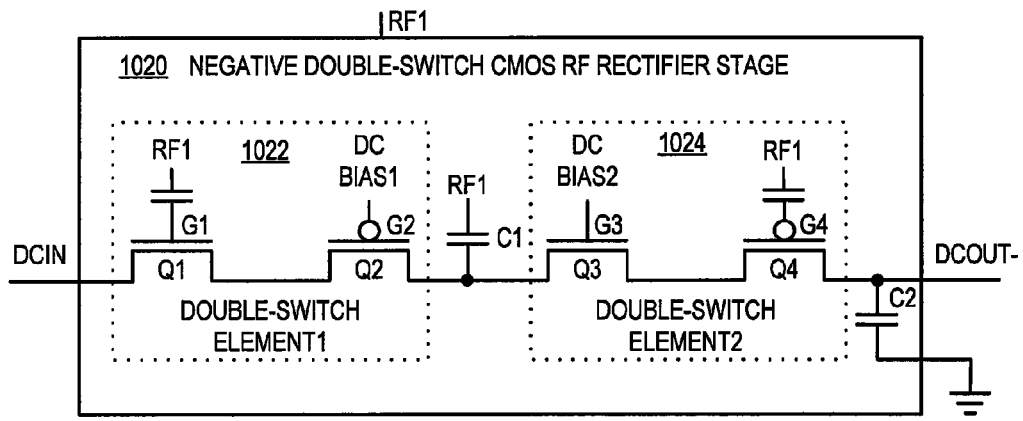
FIG. 10D *NEGATIVE DOUBLE-SWITCH CMOS RF RECTIFIER STAGE*
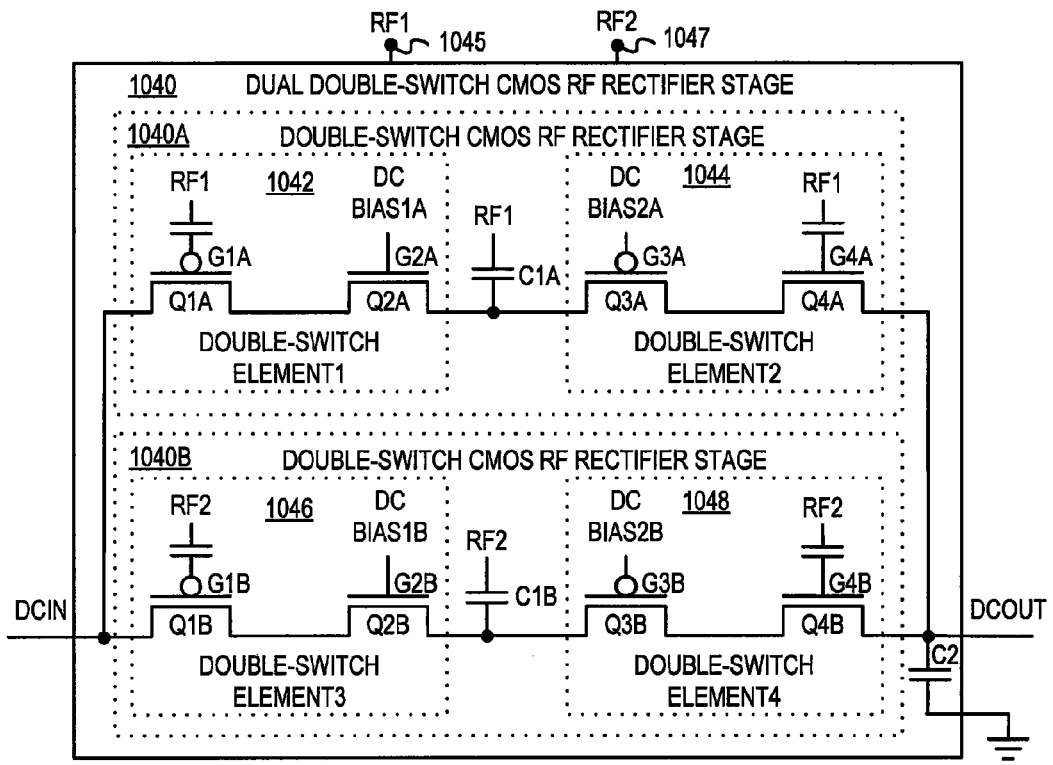
FIG. 10E *DUAL DOUBLE-SWITCH CMOS RF RECTIFIER STAGE*

*CMOS RECTIFIER - CHARGE PHASE*

*CMOS RECTIFIER - DISCHARGE PHASE*

RFID TAG WITH DOUBLE-SWITCH RECTIFIER

RELATED APPLICATIONS

This patent application claims priority from U.S. Provisional Patent Application Ser. No. 60/905,416 filed on Mar. 7, 2007, the disclosure of which is hereby incorporated by reference for all purposes.

This patent application claims priority from U.S. Provisional Patent Application No. 60/925,920 filed on Apr. 24, 2007, the disclosure of which is hereby incorporated by reference for all purposes.

This patent application claims priority from U.S. Provisional Patent Application Ser. No. 60/937,090 filed on Jun. 25, 2007, the disclosure of which is hereby incorporated by reference for all purposes.

This patent application may be found to be pertinent to commonly owned U.S. patent application Ser. No. 12/042,117 and, filed on the same day as the instant application, listing the same inventors with the instant application, and entitled "RFID TAGS WITH SYNCHRONOUS POWER RECTIFIER".

FIELD OF THE INVENTION

The present disclosure addresses the field of Radio Frequency IDentification (RFID) systems, and more specifically RFID tags having one or more voltage rectifier circuits.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Harvesting sufficient power from the RF wave can be difficult since the voltage of the RF signal is in the range of approximately 200 millivolts, and a typical supply voltage for circuits of the RFID tag is one volt. Due to low available RF signal amplitude that it is insufficient to operate the circuitry needed by the RFID tag, the power rectifier circuits typically use charge-pumps to increase the output DC voltage.

Additionally, for relatively high-voltage operations, such as programming and erasing non-volatile memory in the RFID tag, a boosted voltage as high as 12 Volts, may be needed. Complicating matters is that the RF wave received by the RFID tag is not provided constantly, and can cease to be transmitted by the RFID reader without any notice.

Thus, the operation of the passive RFID tag converting the low-level RF waveform to a usable voltage requires a rectifier circuit that can generate usable voltage quickly and efficiently.

BRIEF SUMMARY

The present disclosure provides a power rectifier for a Radio Frequency Identification tag circuit. The power rectifier is constructed from a pair of complementary MOS transistors. Gates of the transistors have predetermined voltages applied to them. The applied voltages bias the transistors to near their active operating regions, while an additional RF control signal is being applied to only one of the gates of the transistors in the complementary pair.

The disclosed power rectifier maximizes an energy harvest efficiency of the RFID tag circuit.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 10A is a simplified schematic diagram of a Double-Switch CMOS RF Rectifier Stage according to embodiments.

FIG. 10B is a schematic diagram of a Double-Switch CMOS RF Rectifier Stage according to embodiments FIG. 10C is a schematic diagram of a Double-Switch element according to embodiments.

FIG. 10D is a schematic diagram of a Negative Double-Switch CMOS RF Rectifier Stage according to an embodiment.

FIG. 10E is a schematic diagram of a Dual Antenna Double-Switch CMOS RF Rectifier Stage according to an embodiment.

DETAILED DESCRIPTION

Figure 1:
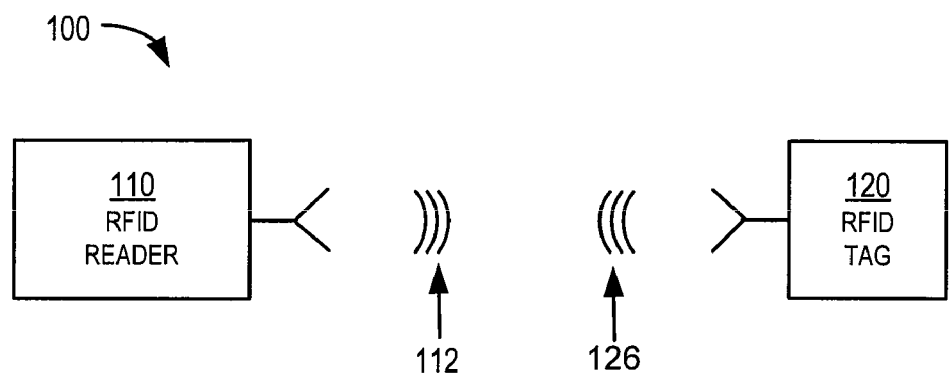
FIG. 1 is a block diagram of an RFID system.

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention might be modified in numerous ways. Among other things, the present invention may be embodied as devices, methods, and so on. Accordingly, the present invention may take the form of an entirely device embodiment, an entirely method embodiment, or an embodiment combining aspects of the above. This description is therefore, not to be taken in a limiting sense.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
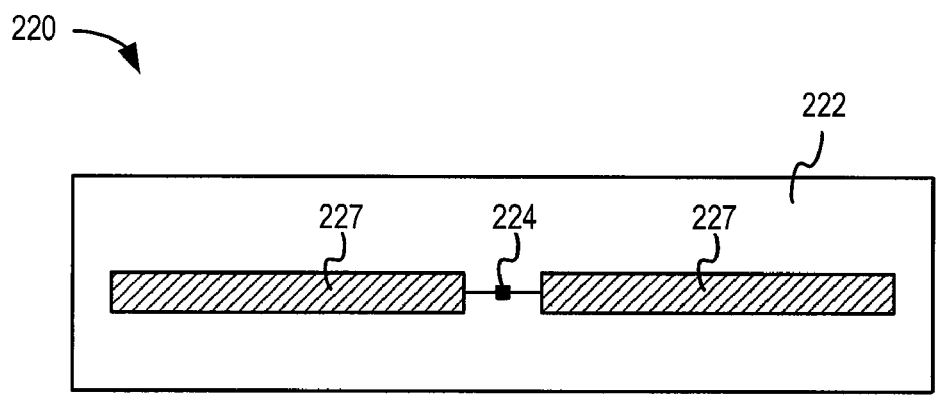
FIG. 2 is a diagram showing components of a passive RFID tag.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes.

Figure 3:
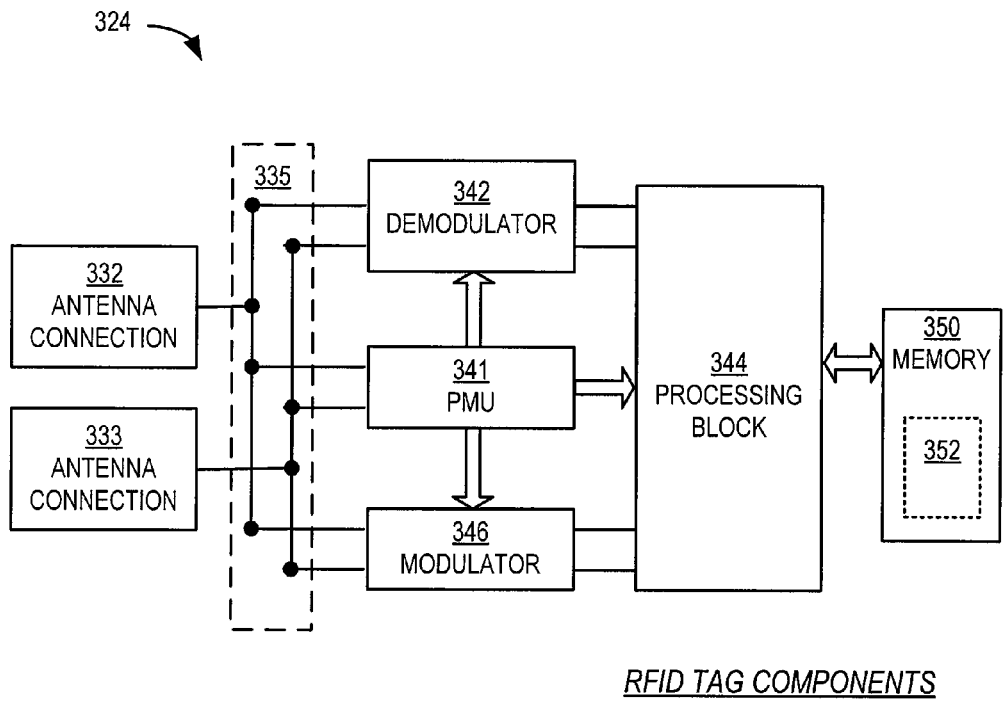
FIG. 3 is a block diagram of an implementation of an electrical circuit formed in an IC of the tag of FIG. 2.

FIG. 3 is a block diagram of an electrical circuit 324. Circuit 324 may be formed on a semiconductor substrate in an IC of an RFID tag, such as IC 224 of FIG. 2. Circuit 324 has a number of main components that are described in this document. Circuit 324 may have a number of additional components from what is shown and described, or different components, depending on the exact implementation.

Circuit 324 includes at least two antenna connections 332, 333, which are suitable for coupling to one or more antenna segments (not shown in FIG. 3). Antenna connections 332, 333 may be made in any suitable way, such as pads and so on. In a number of embodiments, more than two antenna connections are used, especially in embodiments where more antenna segments are used.

Circuit 324 includes a section 335. Section 335 may be implemented as shown, for example as a group of nodes for proper routing of signals. In some embodiments, section 335 may be implemented otherwise, for example to include a receive/transmit switch that can route a signal, and so on.

Circuit 324 also includes a Power Management Unit (PMU) 341. PMU 341 may be implemented in any way known in the art, for harvesting raw RF power received via antenna connections 332, 333. In some embodiments, PMU 341 includes at least one rectifier, and so on.

In operation, an RF wave received via antenna connections 332, 333 is received by PMU 341, which in turn generates power for components of circuit 424

Circuit 324 additionally includes a demodulator 342. Demodulator 342 demodulates an RF signal received via antenna connections 332, 333. Demodulator 342 may be implemented in any way known in the art, for example including an attenuator stage, amplifier stage, and so on.

Circuit 324 further includes a processing block 344. Processing block 344 receives the demodulated signal from demodulator 342, and may perform operations. In addition, it may generate an output signal for transmission.

Processing block 344 may be implemented in any way known in the art. For example, processing block 344 may include a number of components, such as a processor, memory, a decoder, an encoder, and so on.

Circuit 324 additionally includes a modulator 346. Modulator 346 modulates an output signal generated by processing block 344. The modulated signal is transmitted by driving antenna connections 332, 333, and therefore driving the load presented by the coupled antenna segment or segments. Modulator 346 may be implemented in any way known in the art, for example including a driver stage, amplifier stage, and so on.

In one embodiment, demodulator 342 and modulator 346 may be combined in a single transceiver circuit. In another embodiment, modulator 346 may include a backscatter transmitter or an active transmitter. In yet other embodiments, demodulator 342 and modulator 346 are part of processing block 344.

Circuit 324 additionally includes a memory 350, which stores data 352. Memory 350 is preferably implemented as a Nonvolatile Memory (NVM), which means that data 352 is retained even when circuit 324 does not have power, as is frequently the case for a passive RFID tag.

It will be recognized at this juncture that the shown components of circuit 324 can be those of a circuit of an RFID reader according to the invention, with or without needing PMU 341. Indeed, an RFID reader can be powered differently, such as from a wall outlet, a battery, and so on. Additionally, when circuit 324 is configured as a reader, processing block 344 may have additional Inputs/Outputs (I/O) to a terminal, network, or other such devices or connections.

Figure 4:
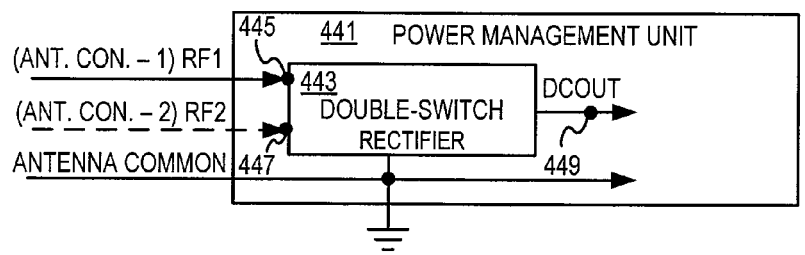
FIG. 4 is a block diagram illustrating components of a Power Management Unit of the circuit of FIG. 3.

FIG. 4 is a block diagram that illustrates a component of Power Management Unit 341 of the circuit of FIG. 3. Power Management Unit 441 includes at least one Double-Switch rectifier 443. Double-Switch rectifier 443 is coupled to a terminal of an antenna (not shown) at input node 445 to receive RF signal RF1, and optionally it may be coupled to a terminal of another antenna (not shown) at input node 447 to receive another RF signal RF2, detected by the antennas. As it will be explained in more detail below, Double-Switch rectifier 443 converts induced alternating current ("AC") voltage captured by the antenna segments into usable DC voltage DCOUT 449. The DC voltage can be used to power operations of RFID tag 220.

Figure 5:
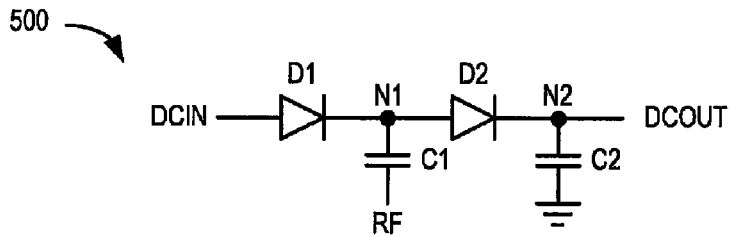
FIG. 5 is a schematic diagram of a conventional Dickson RF Charge-pump Stage according to prior art.

FIG. 5A illustrates Dickson RF charge-pump stage 500. The charge-pump stage 500 includes two diodes D1 and D2 that are coupled in series at node N1. Capacitor C1 is connected between N1 and an RF input signal. Capacitor C2 is connected between a ground and output terminal DCOUT. During the negative half of its AC cycle, the RF input signal forward biases diode D1 and charges capacitor C1. At this time, the voltage V1 at node N1 is equal to DCIN−VT1, where VT1 is a threshold voltage of diode D1. During the positive half of its AC cycle, the RF input signal reverse biases diode D1 and forward biases diode D2. At this time the voltage V1 at node N1 is equal to DCIN−VT1+2*VA, where the RF input signal is given by VA*sin(ωt). Because diode D2 is forward biased, it transfers charge from capacitor C1 to capacitor C2, and the voltage V2 at node DCOUT is equal to DCIN−VT1+2*VA−VT2, where VT2 is a threshold voltage of diode D2.

Figure 6:
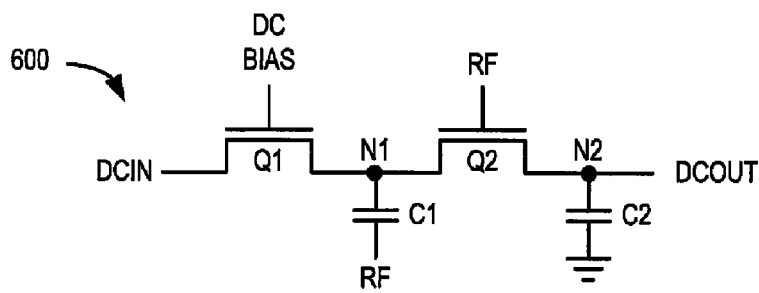
FIG. 6 is a schematic diagram of a conventional NMOS RF Rectifier Stage according to prior art.

FIG. 6 is a schematic diagram of a conventional NMOS RF rectifier stage 600. Rectifier stage 600 includes two NMOS switching transistors Q1 and Q2 that are coupled in series at node N1. Capacitor C1 is connected between N1 and an RF input signal. Capacitor C2 is connected between a ground and output terminal DCOUT.

When a gate bias voltage of transistor Q1 is greater than DCIN+VT1, where VT1 is the threshold voltage of transistor Q1, and the RF input signal is in the negative half of its AC cycle, transistor Q1 turns ON, and voltage V1 at node N1 is equal to DCIN. During this time, transistor Q2 is OFF. When the voltage level of the RF input signal increases from −VA to +VA, transistor Q1 turns OFF and transistor Q2 is turned ON. While transistor Q2 is ON, it transfers charge from capacitor C1 to capacitor C2, and the voltage level V2 at node DCOUT is equal to DCIN+2*VA.

Figure 7:
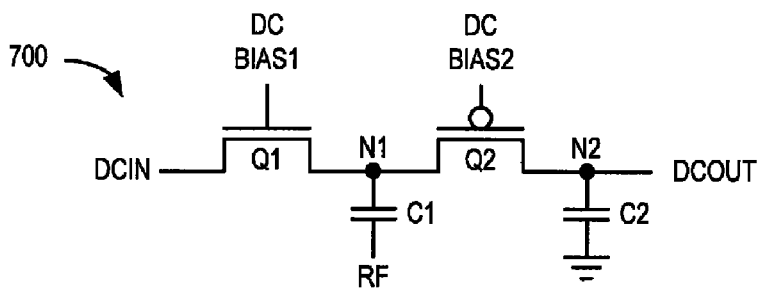
FIG. 7 is a schematic diagram of a conventional CMOS RF Rectifier Stage according to prior art.

FIG. 7 is a schematic diagram of a conventional CMOS RF rectifier stage 700. Rectifier stage 700 includes a pair of CMOS switching transistors Q1 and Q2. Voltage biases are coupled to gates of transistors Q1 and Q2 to provide bias voltages thereto. NMOS transistor Q1 and PMOS transistor Q2 are coupled in series at node N1. Capacitor C1 is connected between N1 and an RF input signal. Capacitor C2 is connected between ground and output terminal DCOUT.

When a gate bias voltage of transistor Q1 is greater than DCIN+VT1, where VT1 is a threshold voltage of transistor Q1, and the RF input signal is in the negative half of its AC cycle, transistor Q1 turns ON and voltage V1 at node N1 is equal to DCIN. During this time, transistor Q2 is OFF. When the voltage level of the RF input signal increases from −VA to +VA, transistor Q1 turns OFF and transistor Q2 is turned ON. While transistor Q2 is ON, it transfers charge from capacitor C1 to capacitor C2, and the voltage level V2 at node DCOUT is equal to DCIN+2*VA.

Figure 8:
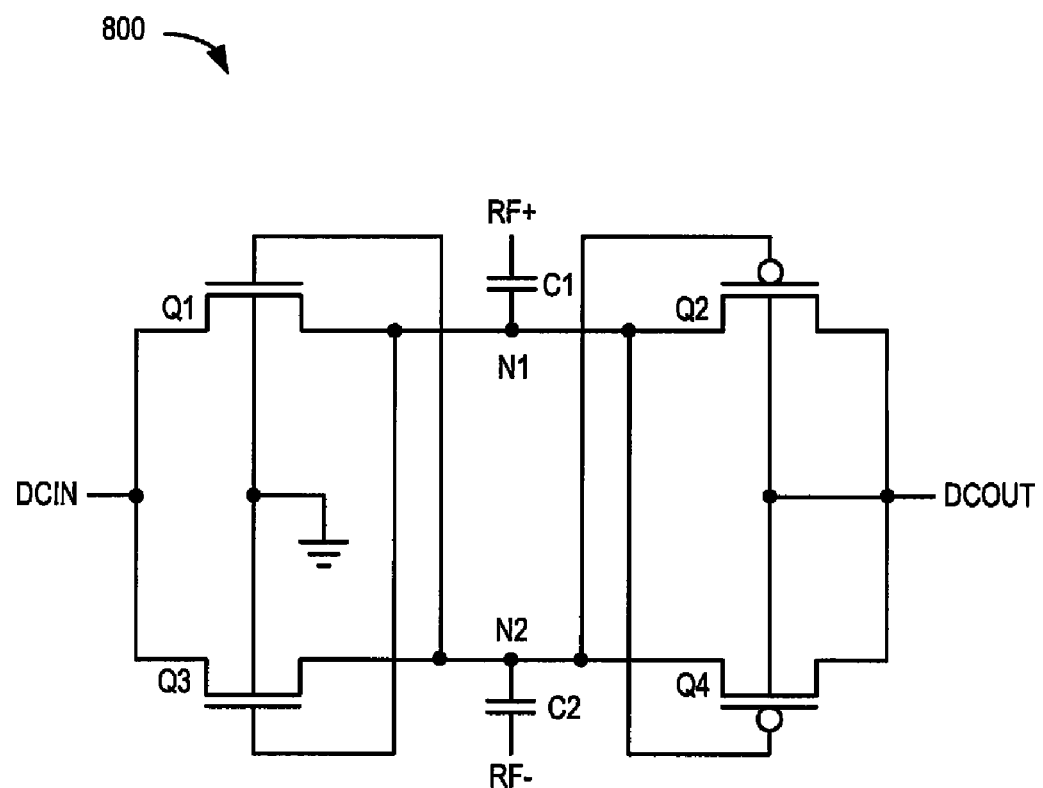
FIG. 8 is a schematic diagram of a single charge-pump cell according to prior art.

FIG. 8 shows a single charge-pump cell 800 using cross-coupled charge transfer switches. Differential RF input voltages RF+ and RF− are used to pump charge through pump capacitors C1 and C2 respectively, thus making DCOUT greater than DCIN.

The circuit works as follows. The RF+ input is given by +0.5*VA*sin(ωt), and the RF− input is given by −0.5*VA*sin(ωt). When RF− is high and RF+ is low, transistors Q1 and Q4 are turned ON, while the other two transistors Q2 and Q3 are turned off. Pump capacitor C2 is connected to RF−, and voltage V2 at node N2 is equal to DCIN+VA. Current flows through transistor Q4 from node N2, charging up the output towards DCIN+VA. At the same time, transistor Q1 charges pump capacitor C1 that is connected to RF+, and voltage V1 at node N1 is equal to DCIN. The whole procedure is repeated during the opposite phase, when the RF input polarities are reversed. During this phase, transistor Q2 and transistor Q3 turn ON, the other two transistors Q1 and Q4 turn OFF and the output is again charged towards DCIN+VA.

Figure 9A:
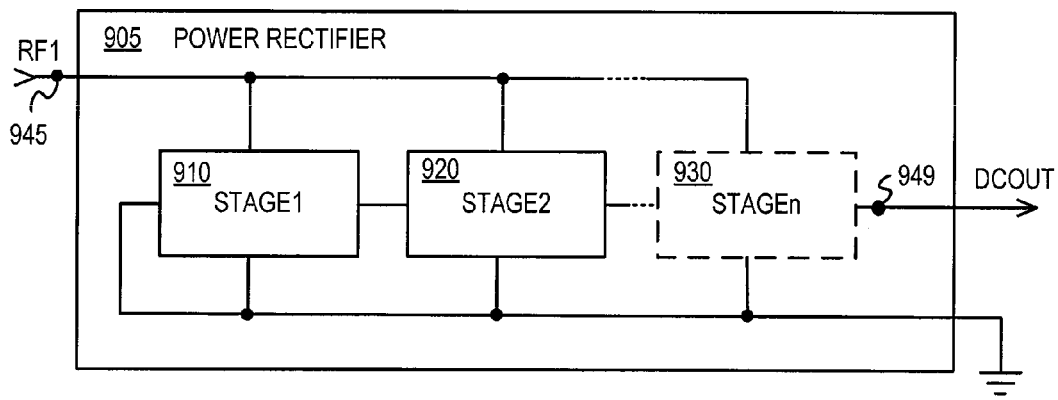
FIG. 9A is a block diagram illustrating power rectifier using Double-Switch stages in the Power Management Unit of FIG. 4 according to an embodiment.

FIG. 9A is a block diagram that illustrates Double-Switch Power Rectifier 905 for the RFID tag. Power Rectifier 905 includes, antenna input node 945 that is configured to receive alternating RF signal RF1 wirelessly, and a number of serially coupled rectifier stages. They are Rectifier Stage1 910 through Rectifier StageN 930. Rectifier Stage1 910 through Rectifier StageN 930 are coupled to ground and also coupled to receive signal RF1. An input node of Rectifier Stage1 910 is connected to ground and output node 949 of Rectifier StageN 930 provides DC output DCOUT.

Figure 9B:
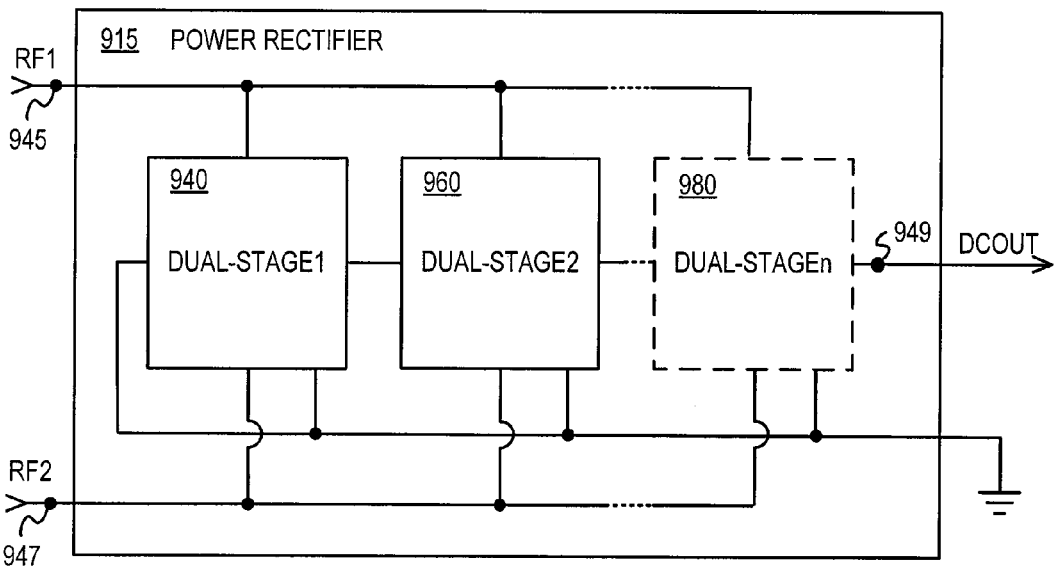
FIG. 9B is a block diagram illustrating power rectifier using dual Double-Switch stages in the Power Management Unit of FIG. 4 according to an embodiment.

FIG. 9B is a block diagram that illustrates Power Rectifier 915 for an RFID tag. Power Rectifier 915 includes, antenna input nodes 945 and 947 that are configured to receive wirelessly alternating RF signals RF1 and RF2 respectively and a number of serially coupled dual Double-Switch rectifier stages, Rectifier Stage1 940 through Rectifier StageN 980. Rectifier Stage1 940 through Rectifier StageN 980 are coupled to ground and also coupled to receive both RF signals, RF1 and RF2. An input node of Rectifier Stage1 940 is connected to ground and output node 949 of Rectifier StageN 930 provides DC output DCOUT.

A Power Rectifier having two antenna ports, as shown in FIG. 9B, may be useful in applications requiring more than one antenna to improve tag orientation insensitivity, or in applications requiring more than a single type of antenna, such as a far field antenna and a near field antenna, etc. It is evident that the Power Rectifier may also be designed to have more than two antenna ports.

FIGS. 10A, 10B, and 10C are diagrams that illustrate different aspects of Rectifier Stage 1010 and its constituting elements according to embodiments. Rectifier Stage 1010 is designed to provide a positive output voltage DCOUT. Rectifier Stage 1010 includes Double-Switch Element1 1012 and Double-Switch Element2 1014. Double-Switch Element1 1012 and Double-Switch Element2 1014 are coupled serially to form rectifier Stage 1010. Capacitor C2 couples an output terminal of Double-Switch Element2 1014 to ground.

Double-Switch Element 1000 is a general representation of a double-switch element that is used in any of the double-switch rectifier stages. Double-Switch Element 1000 illustrates cross-couplings between a complementary pair of transistors Q1 and Q2, where Node A is coupled to Node D while Node B is coupled to Node C. The presence of these cross-couplings is a significant feature of a Double-Switch element.

Double-Switch Element1 1012 includes PMOS transistor Q1 and NMOS transistor Q2. An input terminal of transistor Q2 is coupled to an output terminal of transistor Q1 to form intermediate node Node1. Node1 is not connected to any remaining components of its stage. Gate G1 of transistor Q1 and the output terminal of transistor Q2 are both coupled to antenna input node 1045, to receive RF1. Gate G1 may also be coupled to receive a DC bias voltage in addition to RF1. Gate G2 of transistor Q2 is coupled to receive a DC bias voltage DC BIAS1, while the input terminal of transistor Q1 is coupled to receive a DC voltage.

Double-Switch Element2 1014 includes PMOS transistor Q3 and NMOS Q4. An input terminal of transistor Q4 is coupled to an output terminal of transistor Q3 to form intermediate node Node2. Node2 is not connected to any remaining components of its stage. Gate G3 of transistor Q3 is coupled to receive a DC bias voltage DC BIAS2, while the output terminal of transistor Q4 is coupled to receive a DC voltage. DC BIAS1 could be the same as, or different from, DC BIAS2. Gate G4 of transistor Q4 and the input terminal of transistor Q3 are both coupled to antenna node 1045, to receive RF1. Gate G4 may also be coupled to receive a DC bias voltage in addition to RF1.

The applied DC bias voltages are functions of an amplitude of the RF signal and may be controlled such that the DC output current of the Power Rectifier is substantially maximized for a given RF input power.

FIG. 10D is a schematic diagram of Negative Double-Switch CMOS RF Rectifier Stage 1020 according to an embodiment. Operation principles of Negative Double-Switch Rectifier Stage 1020 and of Double-Switch Rectifier Stage 1010 of FIGS. 10A and 10B are fundamentally are the same. A notable difference is in regard of polarities of the output voltages they provide. Rectifier Stage 1020 provides a DC output voltage at output terminal DCOUT—that is lower than the DC input voltage at input terminal DCIN. Circuit topology of the Rectifier Stage 1020 and Rectifier Stage 1010 are substantially identical. They differ from each other in an arrangement of transistor polarity. Q1 and Q3 are PMOS transistors, and Q2 and Q4 are NMOS transistors in Rectifier Stage 1010, however the corresponding transistors in Rectifier Stage 1020 have the opposite polarity.

FIG. 10E is a schematic diagram of Dual Antenna Double-Switch CMOS RF Rectifier Stage 1040 according to an embodiment. Dual Antenna Rectifier Stage 1040 includes two parallel-coupled rectifier stages, Rectifier Stage 1040A, and Rectifier Stage 1040B. Rectifier Stages 1040A and 1040B are substantially identical with Rectifier Stage 1010. Rectifier Stage 1040A is coupled to antenna input node 1045 to receive RF signal RF1, while Rectifier Stage 1040B is coupled to antenna input node 1047 to receive a RF signal RF2. Rectifier Stages 1040A and 1040B share capacitor C2.

Figure 11:
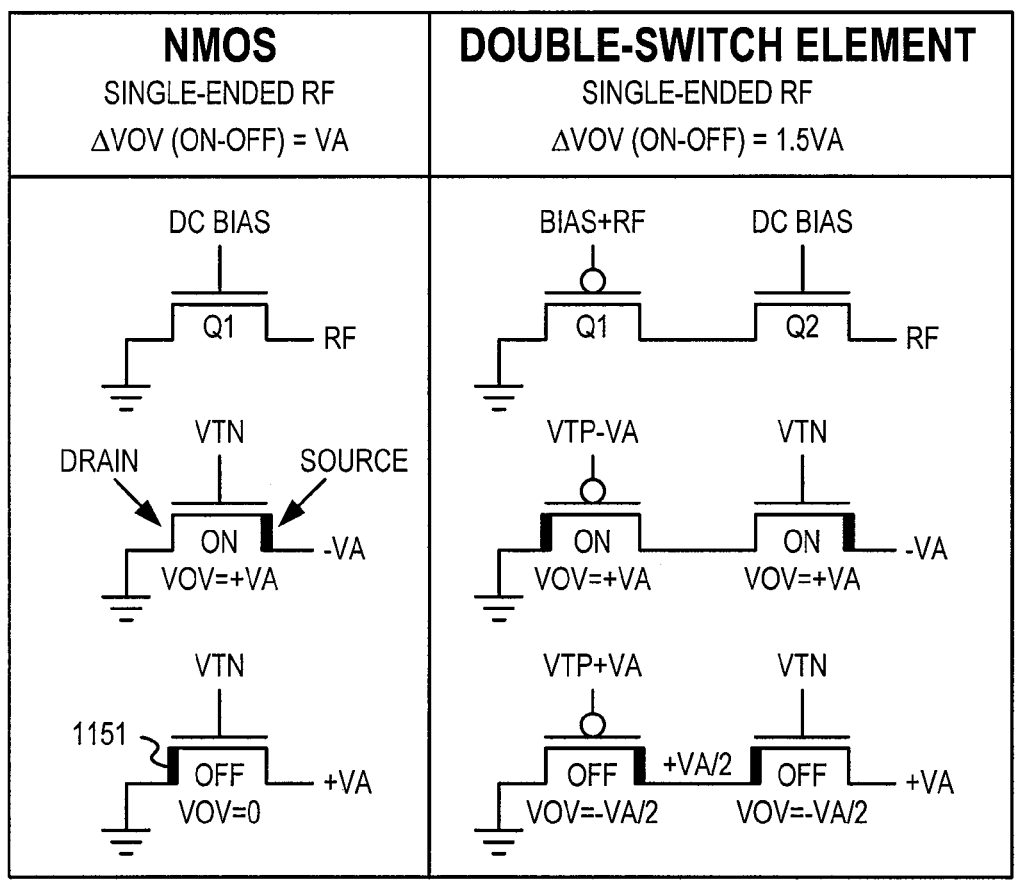
FIG. 11 is a table showing notations that are used for analysis of rectifier circuits of FIGS. 6, 7, and 10B.

FIG. 11 is table 1100 that shows notations that are used for analysis of rectifier circuits of FIGS. 6, 7, and 10B. The following text describes the meaning of these notations, without any specific order. VTN represents a threshold voltage of an NMOS transistor. VTP represents a threshold voltage of a PMOS transistor. VGS represents the difference between the gate voltage and the source voltage of a transistor. VOV represents a value of an overdrive voltage that exists between a gate and a source of a transistor. For an NMOS transistor VOV is equal to VGS−VTN, and for a PMOS transistor VOV is equal to VTP−VGS. A transistor with a higher VOV will have stronger conduction than an equivalent transistor with a lower VOV. This analysis defines a transistor with a positive VOV to be ON and a transistor with a negative VOV or a VOV of zero to be OFF. OFF transistors may have some small amount of conduction depending on their VOV. VA represents the amplitude of an RF signal. −VA represents a negative peak value of the RF signal. +VA represents a positive peak value of the RF signal. Bold line in transistor symbol 1151 represents the source of a transistor. By definition, the end of a channel of an NMOS transistor having the lower potential is referred to as the source, and the end of a channel of a PMOS transistor having the higher potential is referred to as the source. Present analysis assumes that charge flows from a high potential node toward a low potential node, consequently charge flows from drain to source for an NMOS transistor and from source to drain for a PMOS transistor. The term "charge phase" used in the analysis refers to that phase of the RF signal in which charge is added to the capacitor driven by the RF signal. The term "discharge phase" refers to that phase of the RF signal in which charge is transferred from the capacitor driven by the RF signal to the DC output of the stage.

Figure 12A:
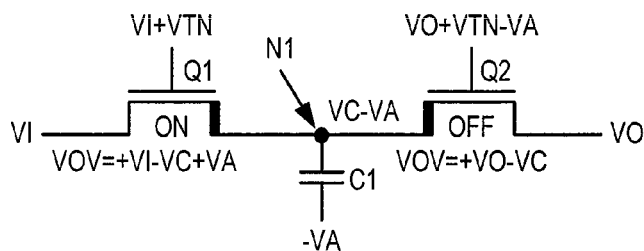
FIG. 12A is an annotated schematic diagram for analyzing switching of the NMOS rectifier during charge phase.

FIG. 12A is annotated schematic diagram 1200A that assists to analyze the NMOS rectifier stage of FIG. 6 during a charge phase. During the charge phase, capacitor C1 is driven by the negative peak of the RF input with a voltage that is valued at −VA, and a gate of transistor Q1 receives a DC bias voltage that is valued at VI+VTN, which creates an overdrive voltage VOV on transistor Q1 that is valued at VI−VC+VA, where VI is the DC input voltage to the stage and VC is the voltage across capacitor C1. Under these conditions transistor Q1 is ON. At the same time a gate of transistor Q2 receives a control voltage that is valued at VO+VTN−VA, which creates an overdrive voltage VOV on transistor Q2 that is valued at VO−VC. Under these conditions transistor Q2 is OFF.

Figure 12B:
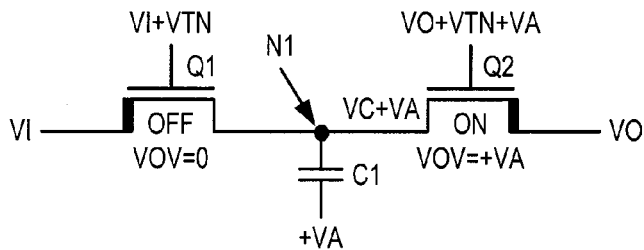
FIG. 12B is an annotated schematic diagram for analyzing switching of the NMOS rectifier during discharge phase.

FIG. 12B is annotated schematic diagram 1200B that assists to analyze the NMOS rectifier stage of FIG. 6 during a discharge phase. During the discharge phase, capacitor C1 is driven by the positive peak of the RF input with a voltage that is valued at +VA, and the gate of transistor Q1 receives a DC bias voltage that is valued at VI+VTN, which creates an overdrive voltage VOV on transistor Q1 that is zero. Under these conditions transistor Q1 is OFF. At the same time, the gate of transistor Q2 receives a control voltage that is valued at VO+VTN+VA, which creates an overdrive voltage VOV on transistor Q2 that is valued at VA. Under these conditions transistor Q2 is ON.

An ON transistor may be strongly ON or weakly ON, depending on its overdrive voltage. The channel current of an ON transistor is higher when its VOV is high and lower when its VOV is low. In addition, an OFF transistor may not be completely OFF, and will have some low value of channel current depending on its overdrive voltage. The channel current of an OFF transistor is low when its VOV is zero, and goes lower when its VOV goes lower.

The power conversion efficiency of a rectifier is higher when its ON transistors have high VOV and are thus strongly ON, and its OFF transistors have low VOV, and are thus substantially OFF. □VOV is defined as the difference between the ON overdrive voltage and OFF overdrive voltage of a transistor, and thus □VOV is an important metric in evaluating rectifier efficiency. A higher □VOV indicates a more efficient rectifier.

For the NMOS rectifier stage analyzed in FIGS. 12A and 12B, the ON overdrive voltage of transistor Q1 is VI−VC+VA and its OFF overdrive voltage is zero. □VOV for Q1 is thus VI−VC+VA. The ON overdrive voltage for Q2 is VA and its OFF overdrive voltage is VO−VC. □VOV for Q2 is thus VA−VO+VC. The average □VOV of both Q1 and Q2 is thus VA−(VO−VI)/2.

Figure 13A:
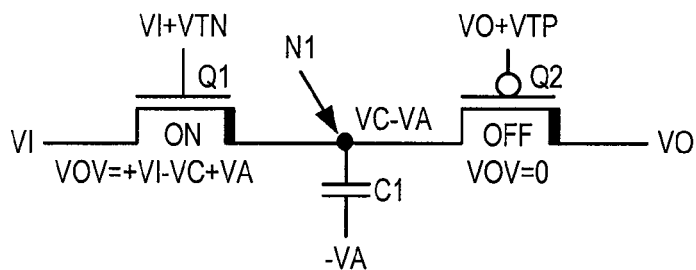
FIG. 13A is an annotated schematic diagram for analyzing switching of the CMOS rectifier during charge phase.

FIG. 13A is annotated schematic diagram 1300A that assists to analyze a CMOS rectifier stage of FIG. 7 during a charge phase. During the charge phase, capacitor C1 is driven by the negative peak of the RF input with a voltage that is valued at −VA, and a gate of transistor Q1 receives a DC bias voltage that is valued at VI+VTN. This condition creates an overdrive voltage VOV on transistor Q1 is valued at VI−VC+VA, where VI is the DC input voltage to the stage and VC is the voltage across capacitor C1. Under these conditions, transistor Q1 is ON. At the same time a gate of transistor Q2 receives a DC bias voltage that is valued at VO+VTP, and the overdrive voltage VOV on transistor Q2 is zero. Under these conditions transistor Q2 is OFF.

Figure 13B:
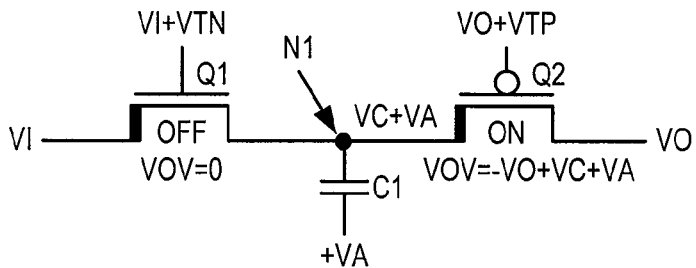
FIG. 13B is an annotated schematic diagram for analyzing switching of the CMOS rectifier during discharge phase.

FIG. 13B is annotated schematic diagram 1300B that assists to analyze a CMOS rectifier stage of FIG. 7 during a discharge phase. During the discharge phase, capacitor C1 is driven by the positive peak of the RF input with a voltage that is valued at +VA, and the gate of transistor Q1 receives a DC bias voltage that is valued at VI+VTN, which creates an overdrive voltage VOV on transistor Q1 that is zero. Under these conditions transistor Q1 is OFF. At the same time the gate of transistor Q2 receives a DC bias voltage that is valued at VO+VTP, and the overdrive voltage VOV on transistor Q2 is valued at VC+VA−VO. Under these conditions transistor Q2 is ON.

For the CMOS rectifier stage analyzed in FIGS. 13A and 13B, the ON overdrive voltage of transistor Q1 is VI−VC+VA and its OFF overdrive voltage is zero. □VOV for Q1 is thus VI−VC+VA. The ON overdrive voltage for Q2 is VC+VA−VO and its OFF overdrive voltage is zero. □VOV for Q2 is thus VC+VA−VO. The average □VOV of both Q1 and Q2 is thus VA−(VO−VI)/2.

Figure 14A:
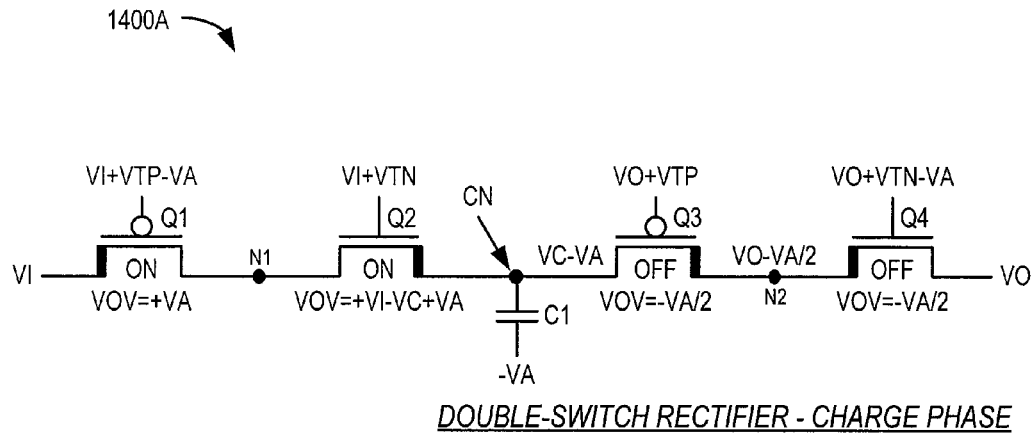
FIG. 14A is an annotated schematic diagram for analyzing switching of the Double-Switch Rectifier during charge phase.

FIG. 14A is annotated schematic diagram 1400A that assists to analyze a Double-Switch rectifier stage of FIG. 10B during a charge phase. During the charge phase, capacitor C1 is driven by the negative peak of the RF input with a voltage that is valued at −VA, and a gate of transistor Q1 receives a control voltage that is valued at VI+VTP−VA, which creates an overdrive voltage VOV that is valued at +VA. While a gate of transistor Q2 receives a DC bias voltage that is valued at VI+VTN, and transistor Q2 has an overdrive voltage VOV that is valued at VI−VC+VA, where VI is the DC input voltage to the stage and VC is the voltage across capacitor C1. Under these conditions, both transistors Q1 and Q2 are ON. At the same time, a gate of transistor Q3 receives a DC bias voltage that is valued at VO+VTP. While a gate of transistor Q4 receives a control voltage that is valued at VO+VTN−VA. Under these conditions the voltage of node N2 is VO−VA/2, which is the voltage at which series connected transistors Q3 and Q4 both have the same small value of OFF channel current and are both OFF with the same negative VOV voltage that is valued at −VA/2.

Figure 14B:
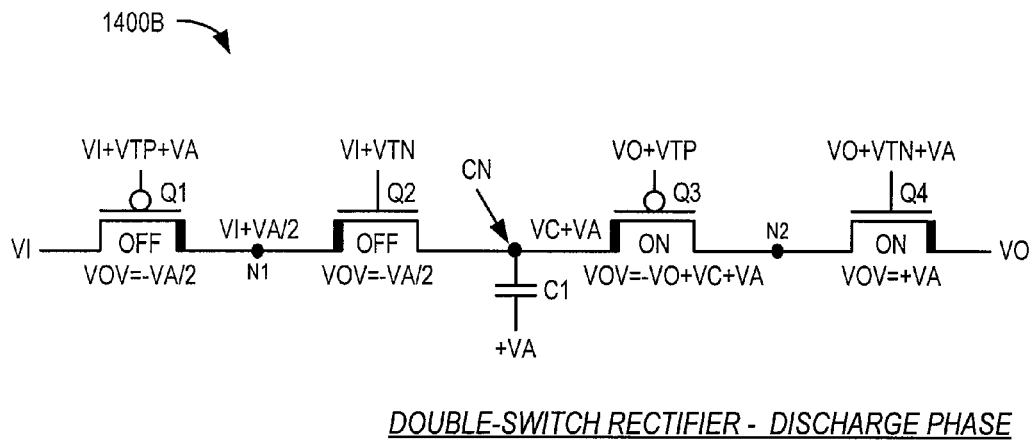
FIG. 14B is an annotated schematic diagram for analyzing switching of the Double-Switch Rectifier during discharge phase.

FIG. 14B is annotated schematic diagram 1400B that assists to analyze a Double-Switch rectifier stage of FIG. 10B during a discharge phase. During the discharge phase, capacitor C1 is driven by the positive peak of the RF input with a voltage that is valued at +VA, and a gate of transistor Q1 receives a control voltage that is valued at VI+VTP+VA. While a gate of transistor Q2 receives a DC bias voltage that is valued at VI+VTN. Under these conditions the voltage of node N1 is VI+VA/2, which is the voltage at which series connected transistors Q1 and Q2 both have the same small value of OFF channel current and are both OFF with the same negative VOV voltage that is valued at −VA/2. At the same time a gate of transistor Q3 receives a DC bias voltage that is valued at VO+VTP, and transistor Q3 has an overdrive voltage VOV that is valued at VC+VA−VO. While a gate of transistor Q4 receives a control voltage that is valued at VO+VTN+VA, and has an overdrive voltage VOV that is valued at +VA. Under these conditions, both transistors Q3 and Q4 are ON.

For the Double-Switch rectifier stage analyzed in FIGS. 14A and 14B, the ON overdrive voltage of transistor Q1 is +VA and its OFF overdrive voltage is −VA/2. □VOV for Q1 is thus +1.5*VA. The ON overdrive voltage for Q2 is VI−VC+VA and its OFF overdrive voltage is −VA/2. □VOV for Q2 is thus VI−VC+1.5*VA. The ON overdrive voltage for Q3 is VC+VA−VO and its OFF overdrive voltage is −VA/2. □VOV for Q3 is thus VC+1.5*VA−VO. The ON overdrive voltage for Q4 is +VA and its OFF overdrive voltage is −VA/2. □VOV for Q4 is thus +1.5*VA. The average □VOV of Q1, Q2, Q3, and Q4 is thus 1.5*VA−(VO−VI)/4. This average □VOV for the Double-Switch rectifier stage is significantly higher than the average □VOV of the prior art NMOS rectifier stage analyzed in FIGS. 12A and 12B and also of the CMOS rectifier stage analyzed in FIGS. 13A and 13B, which both have a lower average □VOV of VA−(VO−VI)/2. This indicates that the power efficiency of the Double-Switch rectifier stage will be higher than the power efficiency of both the prior art NMOS and CMOS rectifier stages.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions, and/or properties disclosed herein. The following claims define certain combinations and subcombinations, which are regarded as novel and non-obvious. Additional claims for other combinations and subcombinations of features, functions, elements, and/or properties may be presented in this or a related document.

The invention claimed is:

1. A power rectifier for a Radio Frequency Identification tag, comprising:
a first antenna input node configured to receive wirelessly an alternating signal; and
a plurality of serially coupled stages, each including components, at least one of the stages coupled to the antenna input node, and including a first Double-Switch element that includes:
a first transistor having an input terminal, an output terminal and a first gate, and
a second transistor having an input terminal, an output terminal, and a second gate,
in which the input terminal of the second transistor is connected to the output terminal of the first transistor to form a first intermediate node that is not connected to any of the remaining components, and
one of the first gate and the second gate is coupled to the first antenna input node, while the other one of the first gate and the second gate is not biased by an alternating signal.

2. The rectifier of claim 1, in which
the first gate is further coupled to the output terminal of the second transistor and to the first antenna input node.

3. The rectifier of claim 1, in which
the second gate is coupled to the input terminal of the first transistor to receive a DC bias voltage.

4. The rectifier of claim 1, in which the first transistor is one of a PMOS and a NMOS and the second transistor is the other of a PMOS and a NMOS.

5. The rectifier of claim 1, in which
the stage that includes the first Double-Switch element further includes a second Double-Switch element that includes:
a first transistor having an input terminal, an output terminal and a first gate, and
a second transistor having an input terminal, an output terminal, and a second gate,
in which the input terminal of the second transistor is connected to the output terminal of the first transistor to form a second intermediate node that is not connected to any of the remaining components, in which
one of the first gate and the second gate of the second Double-Switch element is coupled to the first antenna input node, while the other one of the first gate and the second gate of the second Double-Switch element is not biased by an alternating signal.

6. The rectifier of claim 5, in which
the second gate of the second Double-Switch element is coupled to the input terminal of the first transistor of the second Double-Switch element.

7. The rectifier of claim 5, in which in the second Double-Switch element, the first transistor is one of a PMOS and a NMOS and the second transistor is the other of a PMOS and a NMOS.

8. The rectifier of claim 1, in which
the input terminal of the first transistor of the first element of the first stage is connected to ground.

9. A power rectifier for a Radio Frequency Identification tag, comprising:
a first antenna input node configured to receive wirelessly a first alternating signal;
a second antenna input node configured to receive wirelessly a second alternating signal; and
a plurality of serially coupled dual stages, each including components, at least one of the dual stages coupled to both the first and second antenna input nodes, and including a first dual Double-Switch element that includes:
a first transistor having an input terminal, an output terminal, and a first gate, and
a second transistor having an input terminal, an output terminal, and a second gate,
in which the input terminal of the second transistor is connected to the output terminal of the first transistor to form a first intermediate node that is not connected to any of the remaining components, and
a third transistor having an input terminal, an output terminal and a third gate, and a fourth transistor having an input terminal, an output terminal, and a fourth gate,
in which the input terminal of the fourth transistor is connected to the output terminal of the third transistor to form a second intermediate node that is not connected to any of the remaining components, and
one of the first gate and the second gate is coupled to the first antenna input node, while the other one of the first gate and the second gate is not biased by an alternating signal, and
one of the third gate and the forth gate is coupled to the second antenna input node, while the other one of the third gate and the forth gate is not biased by an alternating signal.

10. The rectifier of claim 9, in which
the first gate is further coupled to the output terminal of the second transistor and to the first antenna input node.

11. The rectifier of claim 9, in which
the second gate is coupled to the input terminal of the first transistor to receive a DC bias voltage.

12. The rectifier of claim 9, in which
the gate of the third transistor is coupled to the output terminal of the fourth transistor.

13. The rectifier of claim 9, in which
the gate of the third transistor is coupled to the second antenna input node.

14. The rectifier of claim 9, in which
the gate of the fourth transistor is coupled to the input terminal of the third transistor to receive a DC bias voltage.

15. The rectifier of claim 9, in which the first transistor is one of a PMOS and a NMOS and the second transistor is the other of a PMOS and a NMOS.

16. The rectifier of claim 9, in which the third transistor is one of a PMOS and a NMOS and the fourth transistor is the other of a PMOS and a NMOS.

* * * * *

UNITED STATES PATENT AND TRADEMARK OFFICE
CERTIFICATE OF CORRECTION

| | | |
|---|---|---|
| PATENT NO. | : 8,044,801 B1 | Page 1 of 1 |
| APPLICATION NO. | : 12/042141 | |
| DATED | : October 25, 2011 | |
| INVENTOR(S) | : Hyde et al. | |

It is certified that error appears in the above-identified patent and that said Letters Patent is hereby corrected as shown below:

After "embodiments" (column 2, line 67), please insert -- . --.

After "424" (column 4, line 67), please insert -- . --.

Signed and Sealed this
Sixth Day of March, 2012

David J. Kappos
*Director of the United States Patent and Trademark Office*